(12) United States Patent
Zhou

(10) Patent No.: US 8,574,682 B1
(45) Date of Patent: Nov. 5, 2013

(54) HOUSING AND METHOD FOR MAKING SAME

(75) Inventor: Shu-Xiang Zhou, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 0 days.

(21) Appl. No.: 13/524,313

(22) Filed: Jun. 15, 2012

(30) Foreign Application Priority Data

Apr. 16, 2012 (CN) .......................... 2012 1 0109926

(51) Int. Cl.
*B05D 3/02* (2006.01)

(52) U.S. Cl.
USPC ..... 427/386; 427/387; 427/393.5; 427/421.1; 427/427.4; 427/427.6; 427/427.7; 427/430.1

(58) Field of Classification Search
None
See application file for complete search history.

(56) References Cited

U.S. PATENT DOCUMENTS

| | | | |
|---|---|---|---|
| 2003/0045626 A1* | 3/2003 | Tamori et al. | 524/547 |
| 2003/0099844 A1* | 5/2003 | Hanahata et al. | 428/447 |
| 2006/0155376 A1* | 7/2006 | Asgari | 623/16.11 |
| 2009/0148711 A1* | 6/2009 | Le Blanc et al. | 428/447 |

OTHER PUBLICATIONS

Abstracts of CN 101323675, Dec. 2008.*
Abstracts of CN 102300346, Dec. 2011.*

* cited by examiner

*Primary Examiner* — Erma Cameron
(74) *Attorney, Agent, or Firm* — Altis & Wispro Law Group, Inc.

(57) ABSTRACT

A housing includes a plastic substrate and a layer formed on the plastic substrate. The layer contains polysiloxane and epoxy resin. The layer is very thin, but evenly forms on the surface of the plastic substrate. The layer has a high hardness and can effectively protect the plastic substrate from abrasion.

7 Claims, 1 Drawing Sheet

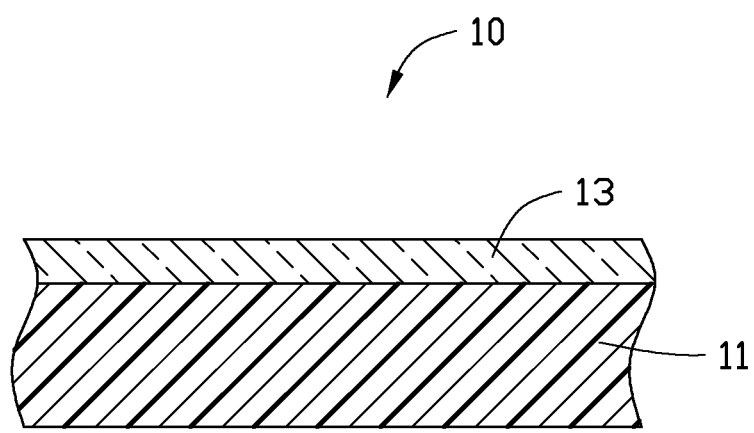

HOUSING AND METHOD FOR MAKING SAME

BACKGROUND

1. Technical Field

The present disclosure relates to a housing and a method for making the housing.

2. Description of Related Art

Housings of electronic devices are usually spray painted to form paint coatings on the housings. However, on some parts of the housing, such as corner regions or bended regions, the paint coating commonly has an uneven thickness and the thickness in these parts is usually greater than the desired or designed thickness. This is because during the spray painting process, paint is prone to accumulate at the corner regions or bended regions. Thickness of the paint coating may be decreased to avoid the accumulation of the paint. However, the paint commonly has a high viscosity, therefore, reducing the thickness of the paint coating can cause an unevenness of the entire paint coating.

Therefore, there is room for improvement within the art.

BRIEF DESCRIPTION OF THE FIGURE

Many aspects of the housing can be better understood with reference to the following drawing. The components in the drawing are not necessarily drawn to scale, the emphasis instead being placed upon clearly illustrating the principles of the housing. Moreover, in the drawing like reference numerals designate corresponding parts throughout the drawing.

The FIGURE is a cross sectional view of an exemplary embodiment of a housing.

DETAILED DESCRIPTION

The FIGURE shows a housing 10 according to an exemplary embodiment. A method for making the housing 10 may include the following steps:

A plastic substrate 11 is provided.

A sol solution is made by mixing silane coupling agent, organic solvent, and deionized water, wherein the mass ratio of the silane coupling agent, organic solvent, and deionized water is (8-15):(80-90):(2-5), respectively. The sol solution is then left standing to make the silane coupling agent completely hydrolyze.

The silane coupling agent is γ-aminopropyl triethoxysilane (also named silane coupling agent KH-550). The silane coupling agent has an amino end group.

The organic solvent can be, for example, isopropyl alcohol or ethanol, but is not limited to the two substances. The organic solution acts as a diluent.

A coating solution is made by mixing the sol solution and epoxy resin while stirring at a high speed. The mass ratio of the sol solution to the epoxy resin is (75-85):(15-25). The coating solution is transparent.

Pigment may be added to the coating solution to provide a color to the coating solution.

The coating solution is coated on the surface of the plastic substrate 11 and dried to form a layer 13 on the plastic substrate 11. The coating method may be a process of spray painting or dipping. The drying of the coating solution is carried out at an environmental temperature of about 95° C. to about 105° C. for about 40 min to about 50 min. The layer 13 contains polysiloxane and epoxy resin. The layer 13 has a thickness of about 0.8 μm to about 1.2 μm, which is thinner than a thickness of the paint coating. The layer 13 is thin and evenly formed on the surface of the plastic substrate 11. The layer 13 has a high hardness due to the epoxy resin contained in the layer 13. The layer 13 can effectively protect the plastic substrate 11 from abrasion.

The housing 10 shown in the FIGURE includes the plastic substrate 11 and the layer 13 formed on the plastic substrate 11. The layer 13 contains polysiloxane and epoxy resin. The polysiloxane has amino groups which crosslink with the epoxy groups of the epoxy resin. The layer 13 has a thickness of about 0.8 μm to about 1.2 μm.

EXAMPLE

Experimental example of the present disclosure is described as follows.

The sol solution is made by mixing γ-aminopropyl triethoxysilane, isopropyl alcohol, and deionized water, wherein the mass ratio of the γ-aminopropyl triethoxysilane, isopropyl alcohol and deionized water is 10:87:3, respectively. The coating solution is made by mixing the sol solution and the epoxy resin while stirring at a high speed, wherein the mass ratio of the sol solution to the epoxy resin is 75:25.

The coating solution is spray painted on the surface of the plastic substrate 11 using a blowgun, and then dried at an environmental temperature of 100° C. for 45 min to form the layer 13. The layer 13 is transparent. The pencil hardness of the layer 13 is higher than H. The plastic substrate 11 is made of polycarbonate.

It is believed that the exemplary embodiment and its advantages will be understood from the foregoing description, and it will be apparent that various changes may be made thereto without departing from the spirit and scope of the disclosure or sacrificing all of its advantages, the examples hereinbefore described merely being preferred or exemplary embodiment of the disclosure.

What is claimed is:

1. A method for making a housing, comprising:
   forming a sol solution by mixing silane coupling agent, organic solvent, and deionized water, the mass ratio of the silane coupling agent, organic solvent, and deionized water being (8-15):(80-90):(2-5), the silane coupling agent having an end group of amino, the silane coupling agent being γ-aminopropyl triethoxysilane;
   forming a coating solution by mixing the sol solution and epoxy resin, the mass ratio of the sol solution to the epoxy resin being (75-85):(15-25);
   providing a plastic substrate; and
   coating the surface of the plastic substrate with the coating solution and drying the coating solution to form a layer.

2. The method as claimed in claim 1, wherein the organic solvent is isopropyl alcohol or ethanol.

3. The method as claimed in claim 1, wherein the coating solution further comprises pigment.

4. The method as claimed in claim 1, wherein coating the surface of the plastic substrate with the coating solution is carried out by blowgun spray painting or dipping coating.

5. The method as claimed in claim 1, wherein the drying of the coating solution is carried out at an environmental temperature of about 95° C. to about 105° C. for about 40 min to about 50 min.

6. The method as claimed in claim 1, wherein the layer has a thickness of about 0.8 μm to about 1.2 μm.

7. The method as claimed in claim 1, wherein the layer contains polysiloxane and epoxy resin.

* * * * *